United States Patent [19]
Ogasawara

[11] Patent Number: 5,254,924
[45] Date of Patent: Oct. 19, 1993

[54] METHOD AND DEVICE FOR CONTROLLING MOTOR IN POWERED SEAT

[75] Inventor: Hiromitsu Ogasawara, Akishima, Japan

[73] Assignee: Tachi-S Co. Ltd., Tokyo, Japan

[21] Appl. No.: 888,556

[22] Filed: May 22, 1992

[51] Int. Cl.5 .......................... B60N 2/02; G05D 3/12
[52] U.S. Cl. .................................... 318/590; 318/567; 318/467; 364/424.05
[58] Field of Search ............ 318/567, 568.1, 590, 318/591, 466, 467, 468, 286, 264, 265, 266; 364/424.05

[56] References Cited

U.S. PATENT DOCUMENTS

| | | | |
|---|---|---|---|
| 4,467,252 | 8/1984 | Takeda et al. | 318/603 |
| 4,728,873 | 3/1988 | Inoue et al. | 318/568 |
| 5,004,967 | 4/1991 | Ogasawara | 318/568.1 |
| 5,019,759 | 5/1991 | Takemura et al. | 364/424.05 X |
| 5,097,185 | 3/1992 | Ogasawara | 318/268 |
| 5,187,665 | 2/1993 | Futami et al. | 364/424.05 |
| 5,197,007 | 3/1993 | Parker | 364/424.05 |

FOREIGN PATENT DOCUMENTS 3-38436 2/1991 Japan .
3-86637 4/1991 Japan .

*Primary Examiner*—Bentsu Ro
*Attorney, Agent, or Firm*—Oldham, Oldham & Wilson Co.

[57] ABSTRACT

Method and device for controlling a motor in a powered seat, wherein a certain standard physique classification is set according to the height of an occupant on the seat, and on the basis of such physical classification, several predetermined standard positions are preset in a central processing unit, and wherein such standard positions may be selected and set temporarily by a mode selection switch and position switch for proper motor control, and further, a desired change of position may be made from the standard position by a manual switch.

8 Claims, 14 Drawing Sheets

METHOD AND DEVICE FOR CONTROLLING MOTOR IN POWERED SEAT

BACKGROUND OF INVENTION

1. Field of the Invention

The present invention relates to method and device for controlling motors in an automotive powered seat which permits adjustment in positions of seating adjusting mechanisms under a motor drive control for providing optimal seating positions for an occupant on the seat according to his or her taste and physique.

2. Description of Prior Art

A well know type of automotive powered seat is equipped with various seating posture adjusting mechanisms, such as a seat slide device, reclining device, and seat back bending device, with a view to enabling an occupant on the seat to adjust the seat in fore-and-aft direction and the inclination angle (reclining angle) of seat back.

This powered seat is used mainly in a driver's seat, but by contrast, an assistant's seat next to the drivers seat is manually operable for those seating posture adjustments.

In fact, an occupant on the assistant's seat usually wishes to select a normal seating posture for getting a good forward view field and sometimes to take an enjoy seating posture for sight-seeing through the window, or to take a relax seating posture for a rest or nap on that seat. Therefore, in the case of such assistant's seat, demand has been increased for an easy, quick adjustment in various seating postures, the same as in the foregoing driver's powered seat.

In constructing the assistant's seat in such a powered seat, an incentive arises to make more simple the switching operations in view of the inevitable troublesome switching works on plural switches for various intended seating postures.

A proposal in this respect would be to design the seat so that, for the relax seat position, the seat back may be greatly inclined backwardly, while the upper part of seat back is being bent or inclined forwardly.

However, when the occupant wants to descend from the seat in such relax position, he or she has to return the respective positions of seat back and its upper part to the normal position through the forward inclination motion of seat back on the whole and then through the backward tilt of the seat back upper part, in which case as well, the occupant encounters the troublesome switching operations for effecting those actions, and therefore it is hard for him or her to descend from the seat. Reversely, when the occupant wants to climb onto the seat which is set in the relax position, he or she has to do similar troublesome switching operations for placing the seat in the normal position in order to take a normal seating posture on the seat. This presents a difficulty to quick seating in this kind of powered seat.

SUMMARY OF THE INVENTION

In view of the above-stated shortcomings, it is therefore a purpose of the present invention to provide improved method and device for controlling a motor in a powered seat, which reduces labor and steps involved in the switching operations for changing and setting a position of the seat.

To attain this purpose, according to the invention, there is basically provided the steps of: detecting at least a location of the seat in a fore-and-aft direction thereof, a reclining angle of the seat back, and a tilt angle of the seat back upper part; classifying a predetermined number of body sections for a physical constitution of an occupant on the seat; defining a certain seat position fitting to each of average physiques obtained for each of such predetermined number of body sections; presetting that certain seat position on the basis of an amount of displacement of the seat, seat back and seat back upper part from their set reference positions, thus defining the seat position to be a standard position for each of the body sections; permitting such standard position to be set temporarily by operation of position switch means; and then permitting adjustment in position of the seat in the fore-and-aft direction, the reclining angle of seat back, and tilt angle of seat back upper part, from the thus-temporarily-set standard position, by operation of a manual switch means.

Accordingly, the standard seat positions can be set temporarily as a reference position, and further can be adjusted on the basis of such references through operation of the manual switch means, which enables an occupant on the seat to quickly find a roughly suitable seat positions according to his or her physiques and then continuously attend to adjusting each of the seat position by operating the manual switch means.

Preferably, the standard seat positions may be set according to an average data of body sections defined by such classification as into divided "tall person" and "small person". Under those two modes, for example, the standard positions may be divided into "enjoy position" where the occupant can enjoy sight-seeing, and "relax position" where he or she can take a rest or a nap, on the seat. Preferably, direct accessibility to a normal position from those other positions may be arranged.

In addition to the standard position, there may be provided a memory position which is able to be set as desired as a desired preset position of the seat, with such an arrangement that a comparison may be made between a present position and one of the standard and memory positions, and, depending on a difference therebetween, the operation orders for changing the foregoing seat positions will be altered in order to cause the seat to be set at one of the standard and memory postions from the present postion.

According to the invention, a device for effecting the above-described methods, basically comprises: a manual switch means for allowing the motor to be manually controlled for adjustment of each of the seat positions; a mode selection switch means for selecting one of predetermined plural modes divided to physical constitution sections of occupant on the seat; a position switch means for selecting one of plural preset standard positions and controlling the corresponding motor; a central processing unit for properly controlling the motor, and position detecting means for detecting each of the seat positions, wherein operation of the position detecting means, the standard positions may be temporarily set for each of the foregoing modes.

Preferably, a memory setting switch means may be provided to set the foregoing memory position.

DETAILED DESCRIPTION OF PREFERRED EMBODIMENT OF THE INVENTION

Figure 1:
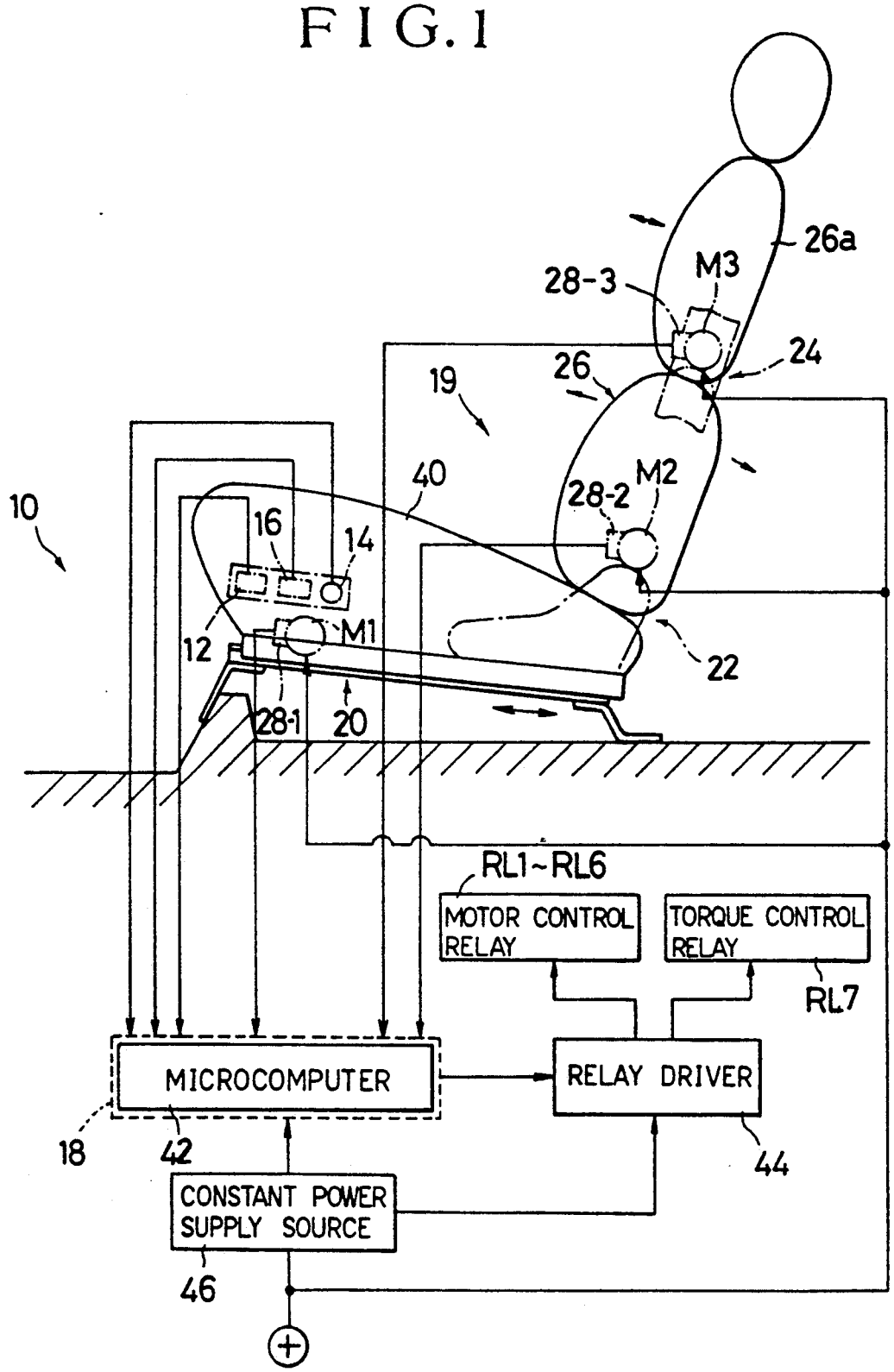
FIG. 1 is a schematic block diagram of a motor control device in powered seat according to the present invention.
Figure 2:
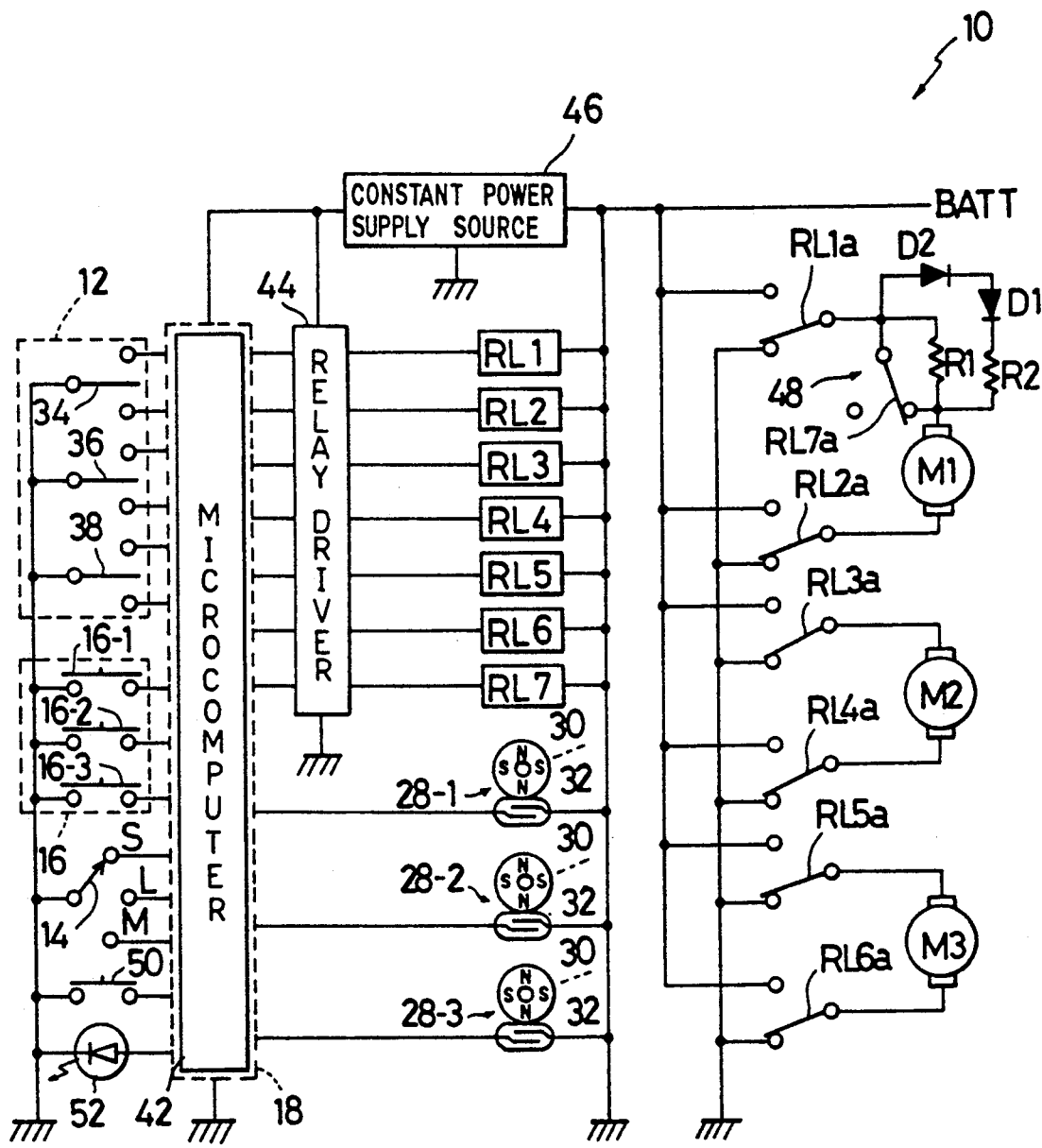
FIG. 2 is a circuit diagram of the motor control device.

Referring to FIGS. 1 and 2, a motor control device (10) in the powered seat, according to the present invention, is shown as comprising manual switches (12), mode section switch (14), position switches (16), a central processing unit (18) to be referred to as CPU, and motors (M1, M2, M3).

The motors (M1, M2, M3) are preferably DC geared motors, and provided as a drive source for driving a seat slide device (20), a reclining device (22), and seat back bending device (24), all of which are installed in the seat (19) (namely, an assistant seat as an example in this context). As will be explained later, the seat slide device (20) is for causing the seat (19) to be moved forwardly and backwardly, the reclining device (22) for causing the seat back (26) to be inclined forwardly and backwardly relative to the seat cushion (40), and the seat back bending device is hereby defined as a device for bending or inclining the upper part (26a) of seat back (26) forwardly and backwardly relative to the lower part of same.

As shown in FIGS. 1 and 2, those motors (M1 M2, M3) are respectively provided with position detectors (28-1, 28-2, 28-3). Each of the position detectors comprises a disc-like permanent magnet (30) fixed to an output shaft (not shown) of motor, and a reed switch (32) disposed adjacent to the magnet (30), which therefore constitutes a rotation sensor. Pulses are emitted from such detectors with rotation of the motor output shaft.

The reed switches (32), as shown in FIGS. 1 and 2, are connected electrically with the CPU (18), so that the pulses generated from the motors (M1, M2, M3) are input to the CPU (18) and counted therein for storage in memory.

For fore-and-aft position adjustment of seat (19), the pulses from the motor (M1) are counted as rotation number of the same motor, for reclining angle of seat back (26), the pulses from the motor (M2) are counted as seat back inclination number thereof, and for bending or inclining angle of the seat back upper part (26a), the pulses from the motor (M3) are counted as the corresponding inclination number thereof. It is noted that the pulses are counted up for normal drive of motor and counted down for reverse drive of same.

As shown in FIG. 2, the manual switches (12) comprises a slide switch (34) for fore-and-aft motion of the seat (19), a reclining switch (36) for inclination of the seat back (26), and a tilt switch (38) for inclination of seat back upper part (26a), all of which are disposed in the lateral wall of seat cushion (40). The three manual switches (34), (36) and (38) are operable for controlling the motors (M1), (M2) and (M2), respectively, and each of them includes a neutral "off" position and two "on" positions, which constitutes a self-return, seesaw type of switch. Those manual switches are electrically connected with the CPU (18).

The CPU (18) includes a microcomputer (42) for processing any input data according to the preset program and outputting proper control signals to the relay driver (44).

Now, assume that the slide switch (34) is operated when the seat is located at a certain position, the corresponding signals are output to the CPU (18), which in turn ouputs a control signal to the relay driver (44). The relay driver (44) emits a signal to energize either of the relevant motor control relays (RL1)(RL2), and then the mating relay contact (RL1a) or (RL2a) are switched over correspondingly, which operates the motor (M1) to cause the seat (19) to move forwardly and backwardly for adjustment purposes. In this embodiment, the switching-over of relay contact (RL1a) will cause normal drive of motor (M1) for forward movement of seat (19), whereas that of another contact (RL2a) will cause reverse drive of motor (M1) for backward movement of seat (19).

The CPU (18) and relay driver (44) are connected with a battery source via a constant power supply (46) to assure flow of constant input current.

As shown in FIG. 2, a torque switch device (48) is provided, which includes a relay contact (RL7a) associated with a control relay (RL7). The contact (RL7a) is designed to cause either a single resistor (R1) or a combination of resistors (R1) and (R2) in parallel to be inserted into a terminal of windings of the motor (M1) within a limited predetermined time at the start or stop of same motor, as will be explained below.

When the slide switch (34) is turned on for seat forward movement, the foregoing control relay (RL7) is energized, simultaneous with the motor control relay (RL1) being energized, by a control signal from the CPU(18). Then, the parallel combination of resistors (R1)(R2) is inserted to the winding terminal of motor (M1), allowing supply of a voltage suppressed by such resistors to the motor (M1) for normal drive thereof.

After lapse of predetermined 0.3 sec. time from the start of motor (M1), the control relay (RL7) is deenerziged by signals from the CPU (18) and relay driver (44), so that the associated relay contact (RL7a) is switched back to bring the terminals of resistors (R1)(R2) into a short circuit relation with each other, thereby applying a usual rated voltage to the motor (M1) to drive same at a predetermined usual speed.

Reversely, when the slide switch (34) is turned for seat backward movement, the control relay (RL7) is energized, simultaneous with energization of the motor control relay (RL2), to cause switching of the respective relay contacts (RL2a)(RL7a). Then, the single resistor (R1) is inserted in series into the winding terminal of motor (M1), thereby supplying a voltage suppressed by the resistor (R1) to the motor (M1) for reverse drive thereof.

After lapse of predetermined time from the start of motor (M1), the control relay (RL7) is deenerziged to switch back its relay contact (RL7a) to bring terminals of the resistor (R1) into a short circuit relation with each other, thereby applying a usual rated voltage to the motor (M1) and thus returning the motor to a usual drive.

Further, at the stop of motor (M1), the relay contact (RL7a) is switched over to cause insertion of the resistor (R1) into the winding terminal of motor (M1) and keep on such insertion only in a predetermined time, whereupon the short circuit formation between the winding terminals of motor (M1) produces a dynamic braking effect to the motor, and such dynamic braking effect is suppressed by the resistor (R1). Thus, the motor (M1) is reduced its rotational speed under thus-suppressed dynamic braking effect and is stopped. After lapse of predetermined time, the control relay (RL7) is deenergized to switch back its contact (RL7a) so as to return the dynamic braking effect to a usual state, whereby the motor (M1) is retained at the stopped state.

This arrangement serves to absorb a shock at the time when the motor starts to work or is stopped, and therefore, in driving an automobile, an occupant is protected against dislocation on the seat due to such shock. The occupant can enjoy comfortable seating anytime. Additionally, after having been suppressed in rotational speed, the motor (M1) is returned to a usual drive at usual speed, which insures smooth and quick movement of seat (19) in the fore-and-aft direction.

In this embodiment, the seat (19) is bodily inclined backwardly as seen from FIG. 1, and as such preferably it may be arranged such that the combination of resistors (R1)(R2) in parallel will be inserted into the motor terminal when the motor (M1) starts to work, so that a torque is increased at that time, enough to move the seat (19) smoothly along the upwardly sloped path.

According to the motor control device (10) in the present invention, the seat (14) is initially placed in a predetermined standard position which matches to the physique of an occupant who sits on the seat, and it is stored in memory. Thus, the seat(19) and seat back (26) are to be set in a desired standard position by operating a mode selection switch (14), contemporarily, which standard position may preset by operation of the position switches (16).

The physique of occupant on the seat is classified according to his or her height, and a standard height will be set by determining a mean value for the tall occupant and small occupant, respectively. The standard position should be set from the seat position required from various seating postures, depending on how tall or small the occupatent is, who wishes to sit on the seat.

As can be seen from the Table 1, predetermined seating postures are classified according to a normal position, a relax position and enjoy position. The normal position is for the seating position where an occupant sits on the seat as usual for driving the car or in a usual seating posture, and set as a common position matching to every physique of occupant. The enjoy position is for the one where the occupant may enjoy sight-seeing through the window, and the relax position is for enabling the occupant to take a rest or a nap on the seat. Both enjoy and relax positions are to be set according to the physique classifications.

It is noted that each of the above classified seating postures or seating positions may be stored in memory as a movement amount of the seat (19) and seat back (26) relative to a set standard and further as a stored memory position in the CPU (18). Those movement mount data is detected from the rotation number of respective motors (M1)(M2)(M3).

Figure 3:
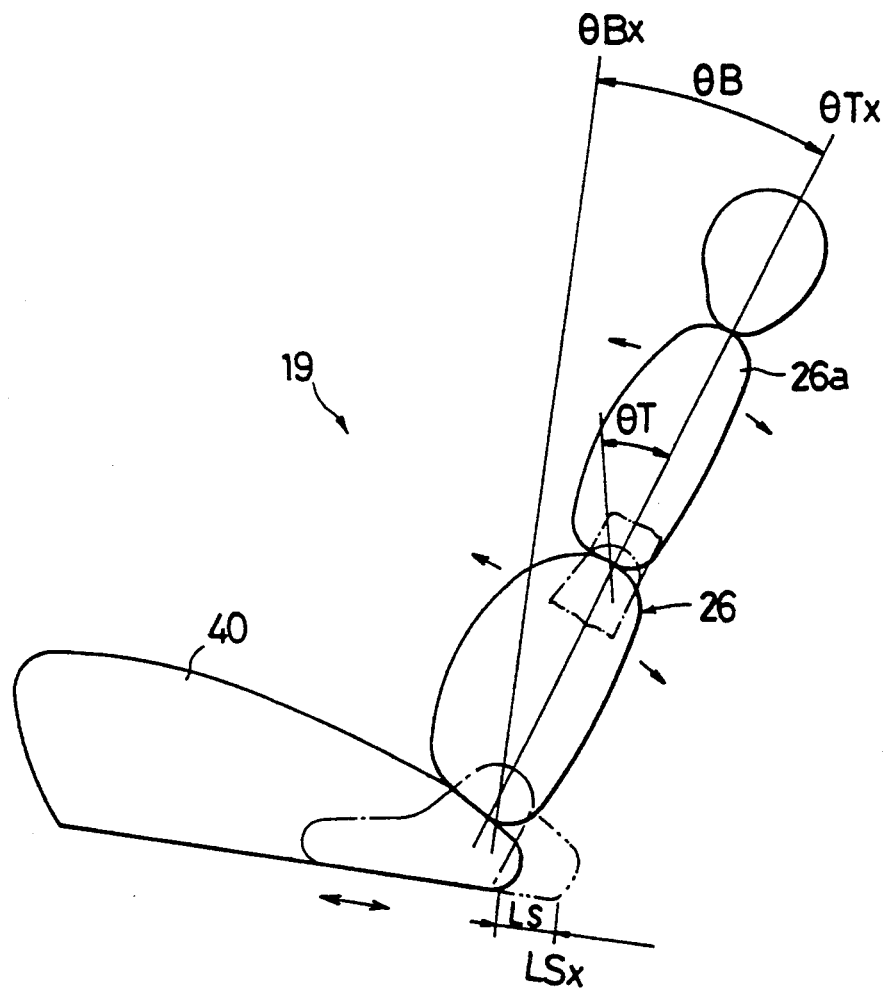
FIG. 3 is a schematic diagram for showing seat positions.

Referring to FIG. 3, the designation (LSx) denotes a set standard for rearmost point in the movable range of the seat slide device (20).

TABLE 1

| POSITIONS | STORED MEMORY POSITION | | | | |
| --- | --- | --- | --- | --- | --- |
| | POSITION (1) | POSITION (2) | | POSITION (3) | |
| SEATING POSTURES | NORMAL POSITION | ENJOY POSITION | | RELAX POSITION | |
| PURPOSES | For seating | For sight-seeing | | For a rest or nap | |
| SWITCHES | POSITION S.W. 16-1 | POSITION S.W. 16-2 | | POSITION S.W. 16-3 | |
| REQUIRED SEATING POSTURES FOR PHYSIQUE PRESENT POSITION | NO | YES | | YES | |
| | | L | S | L | S |
| SLIDE (LS0 = ) | 50 mm | 50 mm | | 50 mm | |
| RECL (θ B0 = ) | 25° | 35° | 35° | 55° | 55° |
| TILT (θ T0 = ) | 0° | 23° | 8.5° | 14.5° | 8.5° |

The forward movement distance of the seat (19) from that rearmost point is given as a slide amount (LS), and the present position of seat is recognized as a present position value (LS1). It should be noted that in the standard position (i.e. the stored memory) above, a memory value (LS0) is set, preferably, about 50 mm in order to sufficiently prevent contact of the seat with an occupant on a rear seat (See also the Table 1).

Designation (θx) denotes a set standard for the reclining device (22), indicating a most forwardly inclined position of the seat back (26). The angular displacement amount of the seat back from that most forwardly inclined position is given as a reclining angle (θB), and the present reclining angle of seat back is recognized as a present angle value (θB1). The reclining angle (θB) is normally set within the range of $19° \leq \theta B \leq 85°$, and the memory value (θB0) in the stored memory above in the respective standard positions is shown in the Table 1.

Designation (θTx) denotes a most backwardly tilted position of the seat back upper part (26a) in the seat back bending mechanism (24). The forwardly tilted angle from that most backwardly titled position is given as a tilt angle (θT) of same upper part (26a), and the present tilted angle thereof is recognized as a present angle value (θT1). Normally, the tilt angle (θT) is set within the range of $0° \leq \theta T \leq 30°$. The memory value (θBT) in the stored memory above in the respective standard positions is shown in the Table 1.

Further, in the motor control device (10), in addition to the foregoing standard position (stored memory position), there is arranged a set memory in which a fresh data for desired seat positions can be loaded. This can be executed by operation of memory setting switch (50), so that an occupant on the seat may load the seat positions into the stored memory.

The memory setting switch (50) may be a self-return, depressing type switch, which is connected with the CPU (18) as shown in FIG. 2. Operating the switch (50) will place in the set memory of CPU (18) the data of counted number detected from the sensors (28-1, 28-2, 28-3) respectively of the motors (M1)(M2)(M3).

As shown in FIG. 2, a memory display (52) is connected with the CPU (18). This display indicates all motions of the memory positions stored in memory, which serves to prevent any incorrect operations in setting a desired memory.

The aforementioned standard and memory positions classified according to the occupant's physique may be selected and set by operating the mode selection switch (14) and positions switches (16) in a proper combination.

The mode selection switch (14) is a three-mode-switchable rotary type switch having rotatable three switch contacts, which is connected with the CPU (18). This switch (14) is operable so as to select one of the following three modes in the previously noted physique classifications (i.e. data of the stored memory): A "S Mode" for a person small in height, a "L Mode" for a person tall in height, and a "M Mode" for the stored memory mode.

The position switch (16), as understandable from FIG. 2 and Table 1, comprises three position switches (16-1)(16-2)(16-3), each being operable to select one of the corresponding normal position (i.e. the Position (1)), enjoy position (i.e. the Position (2)) and relax position (i.e. the Position (3)), and set it. Each of those switches is a self-return, depressing type switch connected with the CPU (14).

With the above-stated arrangement, each of the standard positions can be temporarily set for the respective modes required for physiques by operating the mode selection and position switches (14)(16), so that an occupant on the seat may determine his or her corresponding mode from the foregoing modes and attain a proper seat position close to his or her physical requirements.

Now, if the mode selection switch (14) is operated to select the "S Mode" and the position switch (16-2) is operated, then a memory value is read out for the enjoy position in the S mode, and such value is compared with the present count number of the motors (M1 to M3) (i.e. the present value), and the motors are driven in their corresponding directions until the count number of the motors reach the corresponding memory values. In that way, the seat (19) is automatically and temporarily set in the enjoy position in the S mode.

Figure 4:
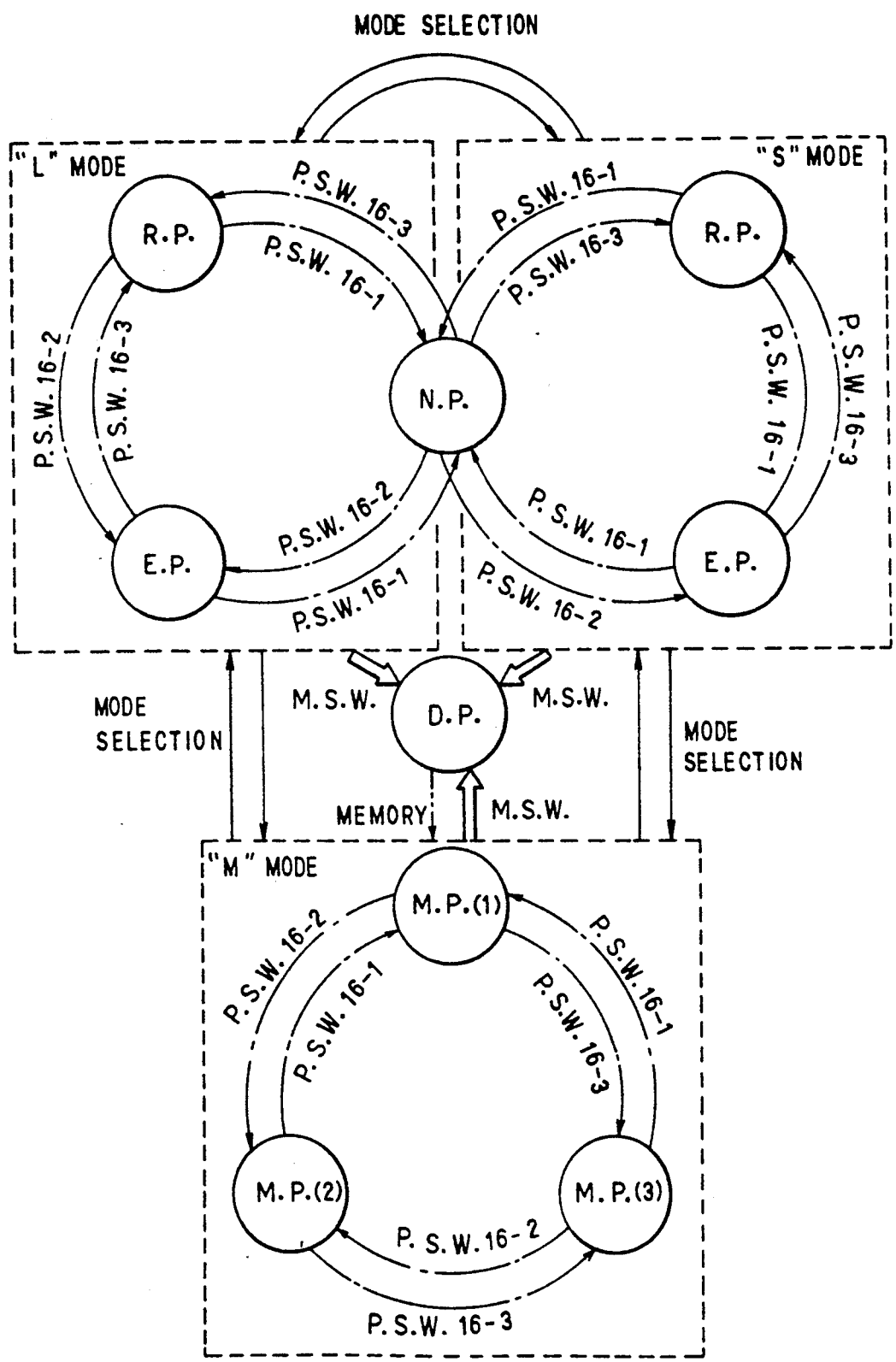
FIG. 4 is a diagram showing interrelations among switches for actuating the motor control device.

If it is desired to strictly set an optimum seat position, the occupant, after having done the above-stated temporary position setting procedures, may simply operate the manual switch (12) to adjust the positions of the seat (19) from thus-temporarily-set standard positions. This eliminates complicated switching operations. Reference is made here to FIG. 4, which represents an operability of the three position switches (P.S.W.) (16-1)(16-2)(16-3) in each of the three modes (L, S, M) and a subsequent, continuous operability of the manual switch (M.S.W.) (12) from one of those three modes. In this figure, designations (N.P), (R.P.), and (E.P.) stand for the normal position, relax position and enjoy position, respectively, and designations (M.P.(1)), (M.P.(2)) and (M.P.(3)) stand for the memory position (1), memory position (2) and memory position (30). The designation (D.P.) stands for a desired, optimum position.

Accordingly, the seat position may firstly be set according to the height of occupant on the seat under the standard classified three modes, then a desired seating posture may be set, for temporarily attaining a proper seating condition, and further if desired, an optimum seat position may be adjustably set by operation of manual switch, which indeed simplifies the switching steps, allowing a quick switch operation. The same goes for the seat back (26).

As understandable from the Table 2, the present device (10) is arranged such that a comparison will be made between the present value ($\theta$B1) for the present reclining angle of the seat back (26) and FIG. 4, which represents an operability of the three position switches (P.S.W.) (16-1)(16-2)(16-3) in each of the three modes (L, S, M) and a subsequent, continuous operability of the manual switch (M.S.W.) (12) from one of those three modes In this figure, designations (N.P), (R.P.), and (E.P.) stand for the normal position, relax position and enjoy position, respectively, and designations (M.P.(1)), (M.P.(2)) and (M.P.(3)) stand for the memory position (1), memory position (2) and memory position (30). The designation (D.P.) stands for a desired, optimum position.

Accordingly, the seat position may firstly be set according to the height of occupant on the seat under the standard classified three modes, then a desired seating posture may be set, for temporarily attaining a proper seating condition, and further if desired, an optimum seat position may be adjustably set by operation of manual switch, which indeed simplifies the switching steps, allowing a quick switch operation. The same goes for the seat back (26).

As understandable from the Table 2, the present device (10) is arranged such that a comparison will be made between the present value ($\theta$B1) for the present reclining angle of the seat

TABLE 2

| SELECTED POSITION | OPERATION ORDERS PRESENT POSITION | | |
|---|---|---|---|
| | POSITION (1) | POSITION (2) | POSITION (3) |
| P.S.W. (16-1) | | | |
| CONDITIONS | | $\theta$B1 $\quad\theta$B1 <$\theta$B0 $\geq\theta$B0 | $\theta$B1 $\quad\theta$B1 <$\theta$B0 $\geq\theta$B0 |
| SLID | | ○ ○ ↓ ↑ | ○ ○ ↓ ↑ |
| RECL | | ○ ○ ↓ ↑ | ○ ○ ↓ ↑ |
| TILT | | ○ ○ | ○ ○ |
| P.S.W. (16-2) | | | |
| CONDITIONS | $\theta$B1 $\quad\theta$B1 <$\theta$B0 $\geq\theta$B0 | | $\theta$B1 $\quad\theta$B1 <$\theta$B0 $\geq\theta$B0 |
| SLID | ○ ○ ↓ ↑ | | ○ ○ ↓ ↑ |
| RECL | ○ ○ ↓ ↑ | | ○ ○ ↓ ↑ |
| TILT | ○ ○ | | ○ ○ |
| P.S.W. (16-3) | | | |
| CONDITIONS | $\theta$B1 $\quad\theta$B1 <$\theta$B0 $\geq\theta$B0 | $\theta$B1 $\quad\theta$B1 <$\theta$B0 $\geq\theta$B0 | |
| SLID | ○ ○ ↓ ↑ | ○ ○ ↓ ↑ | |
| RECL | ○ ○ ↓ ↑ | ○ ○ ↓ ↑ | |
| TILT | ○ ○ | ○ ○ | |

As understandable from FIG. 2, assuming that the present value ($\theta$B1) is smaller than the memory value ($\theta$B0) and the seat back (26) is inclined forwardly by the motor (M2), the slide device (20), reclining device (22), and seat back bending device (24) are actuated in this order so as to change the respective seat positions. Reversely, assuming that the present value ($\theta$B1) is larger than the memory value (θB0), and the seat back (26) is inclined backwardly by the motor (M2), then the orders of operations will be as follows: the bending device (24) the reclining device (22) the slide device (20), for changing the respective seat positions.

In addition, according to the present invention, when the position switch (16-3) is operated to set the relax position (i.e. position (3)), the continuous operation of the same switch (16-3) permits the motors (M1, M2, M3) to be driven, which means that, before the seat reaches the relax position set in the stored memory, turning off that switch will cause immediate stop of the motors, thus effecting on-the-spot positions respectively of the seat (19) and seat back (26). This serves to prevent the seat and seat back against contact with an occupant on a rear seat, only by releasing a push on the switch (16-3); more quickly than one-touch switch system or the like.

Hereinafter, a description will be made of a method for controlling motors in the above-constructed device (10), with reference to the flow charts shown in FIGS. 5 through 13.

Figure 5:
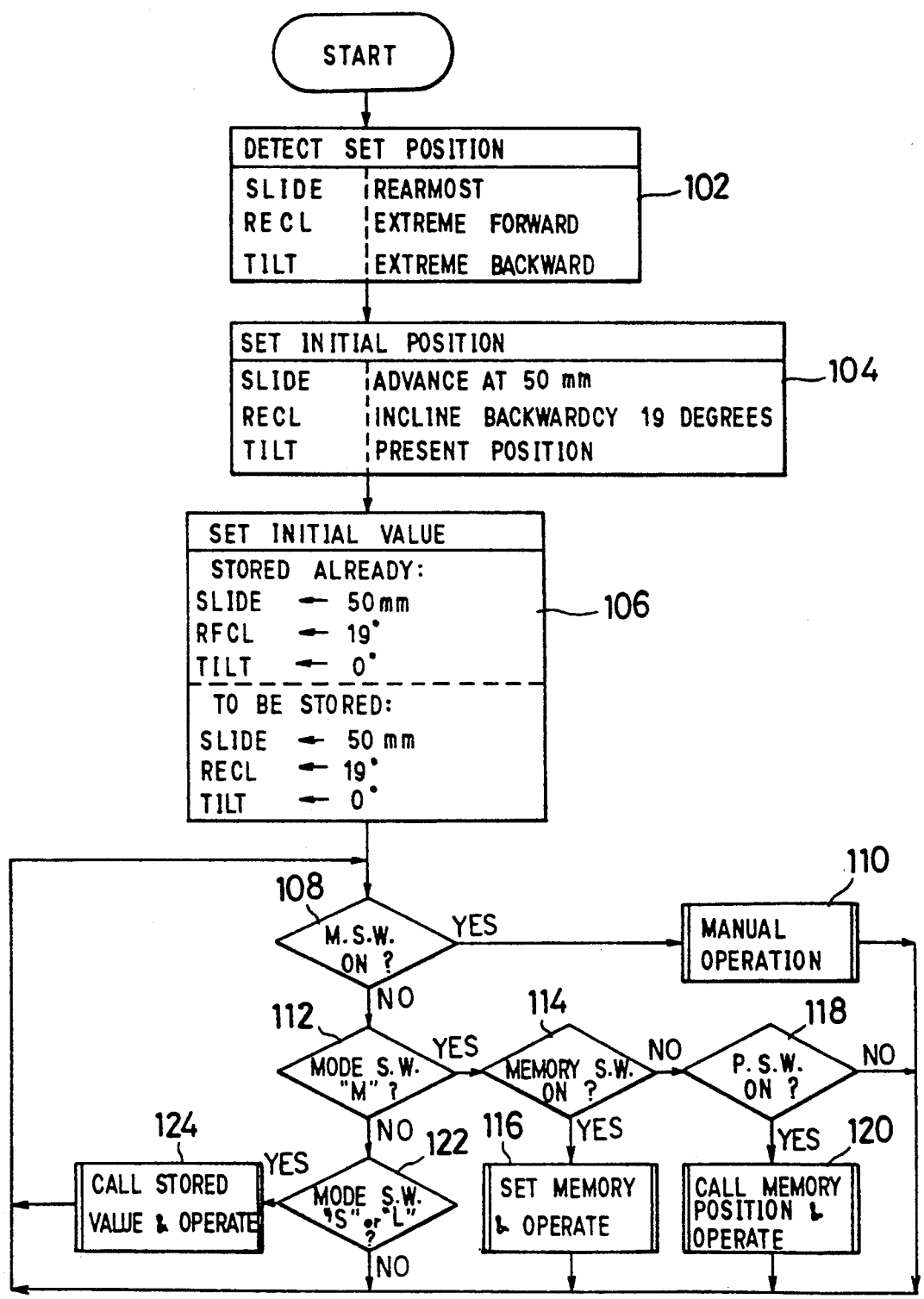
FIG. 5 is a flow chart of a main routine for operations in the motor control device.

Referring to FIG. 5, firstly, upon supplying a power to the device (10) by turning on an ignition switch for example, the step flow starts to the block (102) at which a set reference is detected for positions of the slide device (SLIDE) (20), reclining device (RECL) (22) and seat back bending device (TILT) (24). Then, at (104), the seat (19) and seat back (26) are set in an initial position on the basis of displacement amount from the respective set references by the motors (M1, M2, M3), and at (106), the initial positions are set as a set initial value divided into two present positions as a stored memory position as designated by "STORED ALREADY" and a memory position to be set as designated by "TO BE STORED".

After the above initialization, it is determined whether the manual switch (12) is on or not, at (108). If "YES", an appropriate manual operation routine (not shown) is effected so as to permit manual control of motors (M1, M2, M3) for desired adjustment of the seat (19) and seat back (26) in position.

Here, if the manual switch (12) is not used, at (108), "NO" is decided, and then, a determination is made at (112) as to whether the M mode is chosen by the mode selection switch (14) or not. If the M mode is chosen, "YES" is decided at (112), and next at (114), whether the memory setting switch (50) is on or not is checked up. When the switch (50) is turned on, "YES" is decided at (114), and the step goes to a memory setting operation routine (not shown) so as to store a data of desired seat position as a memory position in one of the positions (1) to (3), in memory at (116).

In the case of the switch (50) being not operated, "NO" is decided at (114), and then at (118), it is checked up whether one of the position switches (16) is or not. If "YES", the steps will undergo a proper processing at the routine for calling and operate memory position at (120) in FIG. 6.

Figure 6:
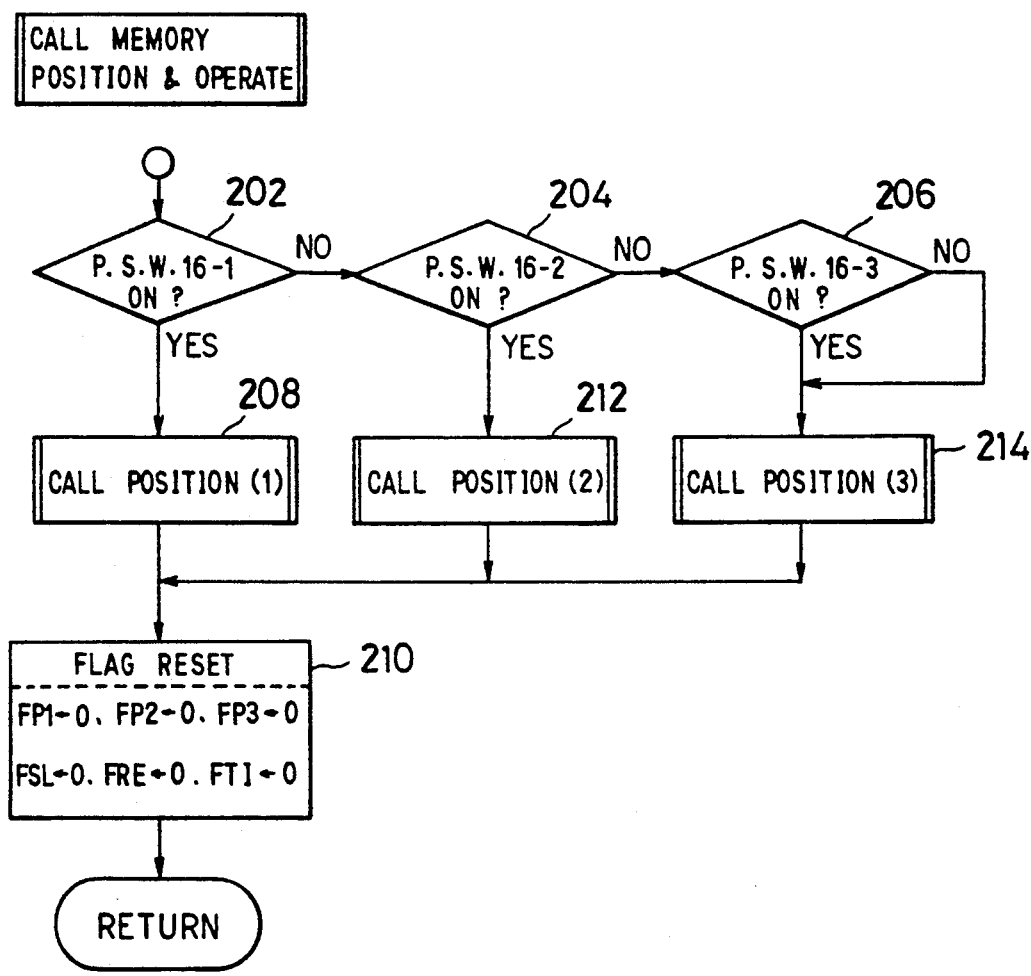
FIG. 6 is a flow chart of a routine for calling memory position and executing associated operations.

As shown in FIG. 6, in such "call memory & operate" routine, a decision will be made as to which of the position switches (16-1)(16-2)(16-3) is operated in sequence. Here, suppose that the position switch (P.S.W. 16-1) is operated, "YES" is decided at (202), the step is led to a block (208) where a proper processing is effected under a routine for calling and operating the position (1), as titled "CALL POSITION (1)", in FIG. 7.

Figure 7:
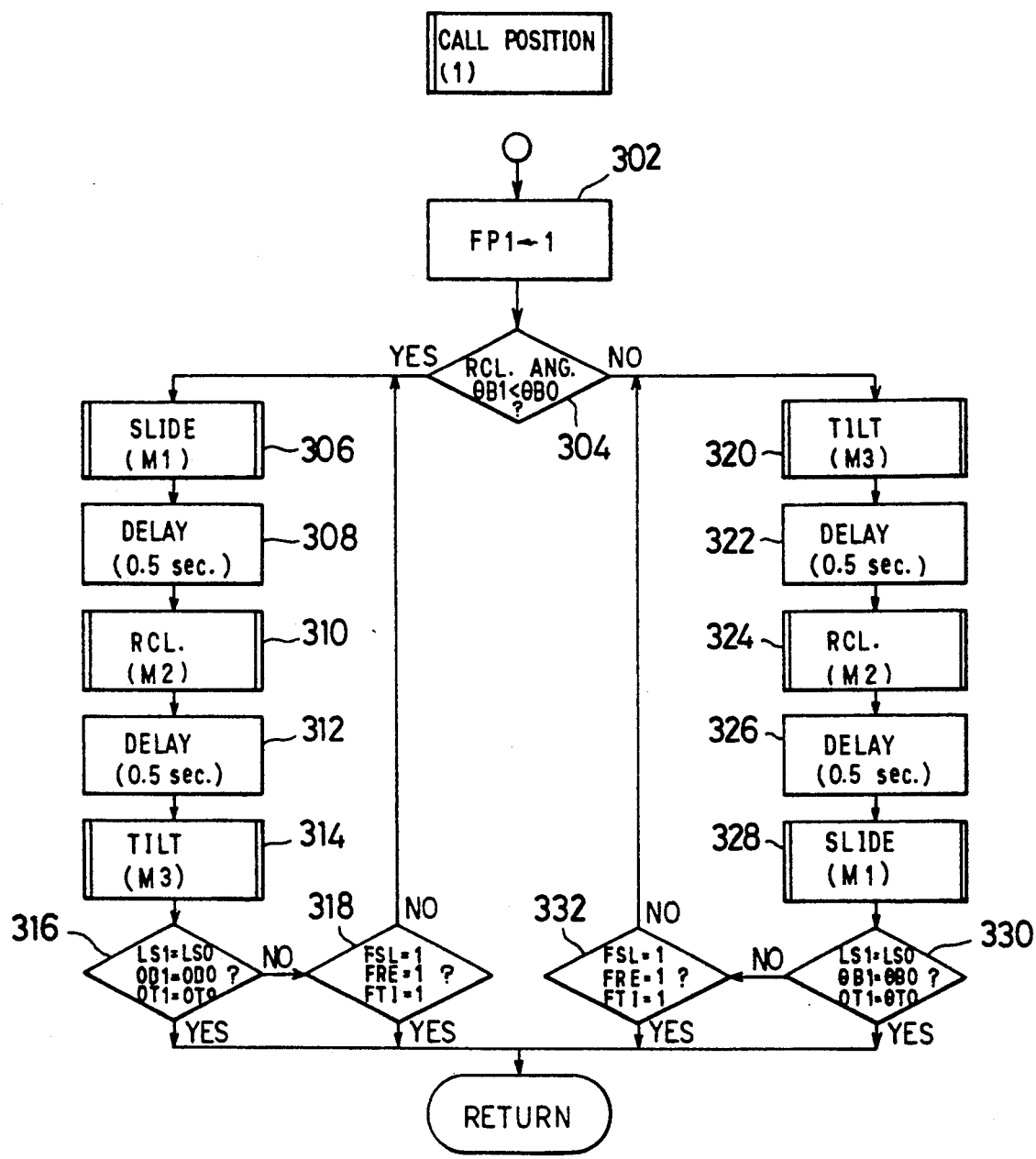
FIG. 7 is a a flow chart of a routine for calling a position (1) and executing associated operations.

As shown in FIG. 7, in such "CALL POSITION (1)" routine, at first, the operation flag (Fp1) for the switch (16-1) is set to 1 as in the block (302), and then, at next block (304), whether or not the present reclining angle (θB1) of seat back (26) is smaller than the memory value (θB0); namely, whether or not the seat back is inclined more forwardly than the memory position, is checked up. If so, "YES" is answered at (304), and then, according to the operation orders in the Table 2, firstly, a proper processing is effected in a routine for driving the motor (M1) for actuating the slide device, as titled "SLIDE (M1)" in FIG. 8, to set position of the seat in the fore-and-aft direction.

Figure 8:
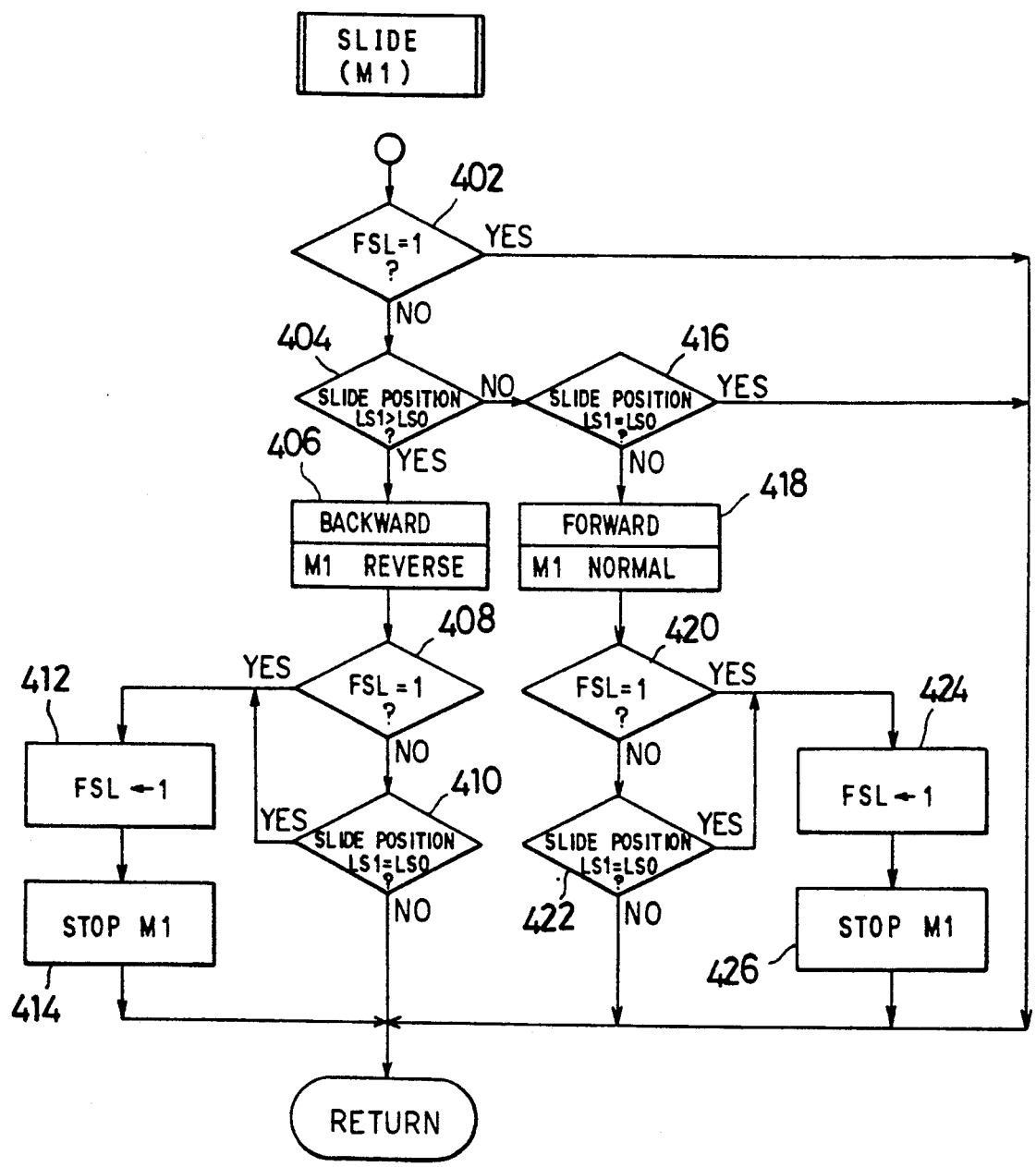
FIG. 8 is a flow chart of a routine for effecting the fore-and-aft motion of seat.

As shown in FIG. 8, in such "SLIDE (M1)" routine, the step is firstly led to the determination at (402) as to whether an overload detection flag (FSL) is set to 1 or not. By such flag, an overload state of the motor (M1) is detected, if any. Normally, as the motor is not in the overload state, "NO" is given there, and then, at next block (404), it is checked up whether the present value (LS1) for the slide position of seat (19) is larger than the memory value (LS0) or not; namely as to whether the seat is located at a more forward position than the memory position, or not. Assume now that the seat (19) is located more forwardly than the memory position, then at (404), the answer "YES" is given and the motor (M1) is driven in the reverse direction to cause the seat (19) to move backwardly at (406). Thereafter, at (408), it is ascertained whether the overload detection flag (FSL) is set to 1 or not; namely, whether the motor (M1) is in an overload state or not. Normally, as the motor (M1) works without any trouble and thus the flag (FSL) is reset to 0, the foregoing block (408) gives "NO" decision, in which case, a decision will be made at (410) as to whether the present (slide) value (LS1) meet with the memory value (LS0) or not. If "YES" is decided there, the flag (FSL) set to 1 at (412), whereupon the motor (M1) is stopped to thereby set the position of seat responsive to the memory position in the fore-and-aft direction, as at (414).

Reversely, in the case where the seat (19) is located more backwardly than the memory position and the position switch (16-1) is operated, then the step goes to the block (404), at which "NO" is decided, and then at (416), whether or not the present value (LS1) meets with the memory value (LS0) is determined. Here, since no coincidence exists between those values (LS1) and (LS0), the block (416) also gives "NO" decision, whereupon the motor (M1) is driven in the normal direction to cause forward movement of seat (19) at (418). In this case, a similar motor overload detection is carried out as above, as shown in FIG. 8.

Upon the seat (19) being located at the memory position, the step flow is returned to the "CALL POSITION (1)" routine in FIG. 7. The, at (306), when the seat slide motion is finished, a time delay of about 0.5 sec. is provided at (308), after which, a proper routine for reclining operation as titled "RCL. (M2)" in FIG. 9 is effected to drive the motor (M2), so that the reclining angle of seat back (26) is set at (310) as in the Table 2.

Figure 9:
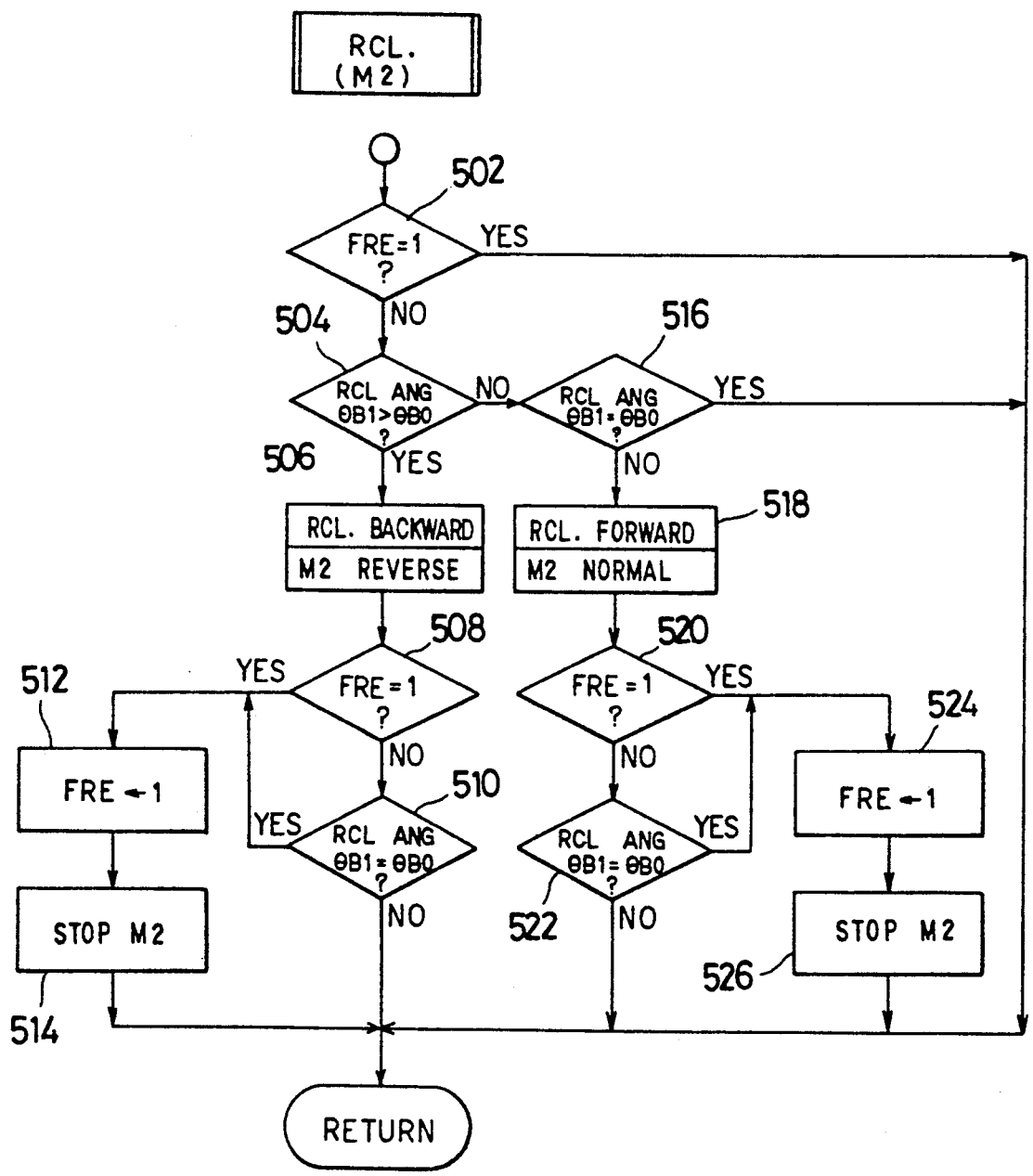
FIG. 9 is a flow chart of a routine for effecting the reclining motion of seat back.

As shown in FIG. 9, in such "RCL. (M2)" routine, similar to the slide routine above, a determination is made as to whether the overload detection flag (FRE) is set to 1 or not, at (502). If "NO" is decided there, at next block (504), it is decided whether or not the present value (θB1) (i.e. present reclining angle) of the seat back (26) is larger than the memory value (θB0); namely whether or not the seat back is inclined more forwardly that the memory position. If "YES" is given there, the seat back is caused to incline backwardly by reverse drive of motor (M2) at (504), and thereafter, whether or not the overload detection flag (FRE) is set to 1 is checked up at (508). If "NO" is decided there, it is ascertained at (510) whether the present value ($\theta$B1) meets with the memory value ($\theta$B0) or not. If "YES" is answered at (510), the flag (FRE) is set to 1 at (512) and at (514) the motor (M2) is stopped to set a reclining angle of seat back corresponding to the memory position. On the other hand, if the seat back- (26) is inclined more backwardly than the memory position, operating "the position switch (16-1) will lead the step flow to "NO" decision at the reclining routine (504) in FIG. 9, and then it is determined at (516) whether or not the preset value ($\theta$B1) meets with the memory value ($\theta$B0). "NO" is naturally answered there as those two values do not meet with each other, which therefore instruct the motor (M2) to drive in the normal direction for inclining the seat back (26) forwardly at (518).

Thereafter, at (520), it is checked whether the flag (FRE) is set to 1 or not, and if "NO" is answered there in view of the motor (M2) being driven without load, then at (522) it is decided whether the present value ($\theta$B1) meets with the memory value ($\theta$B0) or not. With the forward inclination of seat back (26) by the normal drive of motor (M2), when the present value ($\theta$B1) reaches the memory value ($\theta$B0), a block (522) gives "YES" answer, leading the step flow to a block (524) wherein the flag (FRE) is set to 1 for ceasing the drive of motor (M2), to thereby set a reclining angle of seat back corresponding to the memory position. The step is then returned to the "POSITION (1)" routine in FIG. 7. After lapse of about 0.5 sec. time delay at (312), a proper processing is effected at "TILT (M3)" routine in FIG. 10, wherein the motor (M3) is driven in order to set a tilt angle of the seat back upper part (26a) at (314) according to the Table 2.

Figure 10:
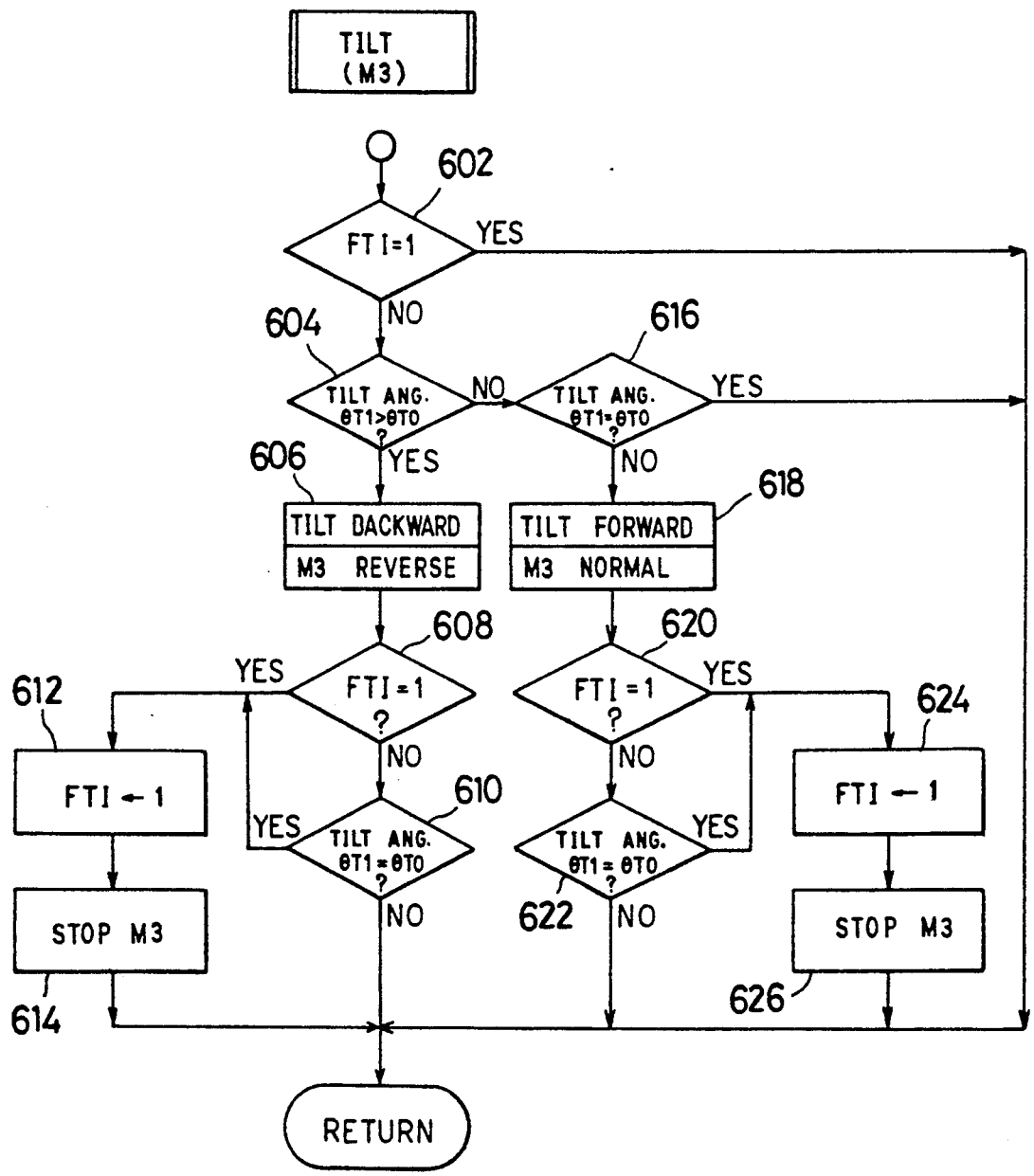
FIG. 10 is a flow chart of a routine for effecting the tilt of seat back upper part.

As shown in FIG. 10, similarly to the slide routine above, firstly at (602) it is checked up whether an overload detection flag (FT1) for the motor (M3) is set to 1 or not. As "NO" is naturally answered there in view of non-load state of motor (M3), leading the step to a block (604) for determining whether the present value ($\theta$T1), i.e. the present title angle of seat back upper part (26a), is larger than the memory value ($\theta$T0) or not; that is, whether the seat back upper part (26a) is tilted more forwardly than the memory position. Assume now that the seat back upper part (26a) is inclined more forwardly than the memory position, "YES" is answered at (604), causing the reverse drive of (M3) at (606) for tilting the seat back upper part (26a) backwardly. Thereafter, firstly at (608) determination is made as to whether the flag (FT1) is set to 1 or not, and with "NO" answer given there, at (610), it is ascertained whether the present value ($\theta$T1) meets with the memory value ($\theta$T0) or not. At completion of backward tilt of the upper part (26a), and with the present value ($\theta$T1) reaching the memory value ($\theta$T0), "YES" is given at (610), which leads the step to a block (612) setting the flag (FT1) to 1 for ceasing the drive of motor (M3), thereby setting a tilt angle of seat back upper part (26a) corresponding to the memory position at (614).

Reversely, with the seat back upper part (26a) being titled backwardly from the memory position, operating the position switch (16-1) makes the answer "YES" at a block (604) in the "TILT (M3)" in FIG. 10, and then at (616) a decision is made as to whether the present value ($\theta$T1) or the present tilt angle meets with the memory value ($\theta$T0) or not. Because of non-coincidence between those two values at this point, "NO" is decided at (616), and then the motor (M3) is driven in the normal direction to cause forward tilting of the seat upper part (26a) at (618). Thereafter, at (620), with a checking as to the overload detection flag (FT1), the answer there is "NO" indicating that the flag is not set to 1, thus leading the step flow to a block (622) wherein it is determined whether the present value ($\theta$T1) meets with the memory value ($\theta$T0) or not. When those two values are in registry with each other, "YES" is decided at the block (622), and at (624) the flag (FT1) is set to 1, whereupon the motor (M3) is stopped to set a tilt angle of the seat back upper part (26a) corresponding to the memory position at (626).

In consequence, the step flow is returned to the "CALL POSITION (1)" routine in FIG. 7, and at a block (316) it is ascertained whether all the present values (LS1), ($\theta$B1) and ($\theta$T1), respectively of the slide device, reclining device and seat back bending device, meet with their corresponding memory values. If "YES" is given there, the step flow is returned to the "CALL MEMORY POSITION & OPERATE" routine in FIG. 6.

As shown in FIG. 6, at (210), all the operation flags (FP1), (FP2) and (FP3) associated respectively of the routines titled POSITIONS (1), (2) and (3) are reset to 0, and so are the overload detection flags (FSL)(FRE)(FT1) associated respectively of the motors (M1)(M2)(M3), as a result of which the step is returned to the main routine in FIG. 5.

It is noted that, in the "CALL POSITION (1)" routine in FIG. 7, if an overload occurs, causing stop of the motors (M1)(M2)(M3) before the respective positions reach the corresponding memory positions, then at the block (316), "NO" is given, recognizing that the present vlaues (LS1), ($\theta$B1) and ($\theta$T1) do not meet with the corresponding memory values. The step is then led to the block (318) for determining whether all the overload detection flags (FSL)(FRE) (FT1) are set to 1. If one of them is reset to 0, "NO" is decided there, and the step flow is again led to the corresponding one of sub routines at (306), (310) and (314) for causing one of the motors (M1) (M2)(M3) so as to set a position of relevant seat sections in correspondence with its associated memory position.

Suppose now that the seat back (26) is inclined more backwardly than the memory position and the position switch (16-1) is operated, "NO" decision is laid down at the block (304) in FIG. 7, in which case, according to the operation orders in the Table 2, an appropriate processing is effected in a manner reversal to the operations done in causing forward inclination of seat back (26): Namely, at first, the step undergoes a proper processing at (320) in the "TILT (M3)" routine so as to set a tilt angle of the seat back upper part (26a) in correspondence with the memory position. After lapse of 0.5 sec. time delay at (322), the step undergoes a proper processing in the "RCL. M(2)" routine in FIG. 9 so as to set a reclining angle of the seat back (26) at (324). Thereafter, with a time delay of about 0.5 sec. at (326), a proper processing is done in the "SLIDE (M1)" routine in FIG. 8 so as to set a position of the seat (19) in the fore-and-aft direction in correspondence with the memory position at (328). Also in this particular case, at (330), it is ascertained whether all the present values (LS1), ($\theta$B1) and ($\theta$T1) respectively of the sliding, reclining and seat back bending device are resistry with the corresponding memory values. If "YES" is answered there, the step flow is returned to the "CALL MEMORY POSITION & OPERATE" routine in FIG. 6.

If one of the foregoing present values does not meet with its corresponding memory value, then at (330) in FIG. 7, "NO" is decided, thus leading the step to the block (332) for determining whether all the flags (FSL)(FRE)(FT1) are set to 1 or not. If one of them is reset to 0, then "NO" is given at that block (332), and the step therefore undergoes the corresponding one of the sub routines (320)(324) (328) so as to cause drive of corresponding one of motors (M1)(M2)(M3) to set a position of the relevant seat sections in correspondence with its associated memory position.

Figure 11:
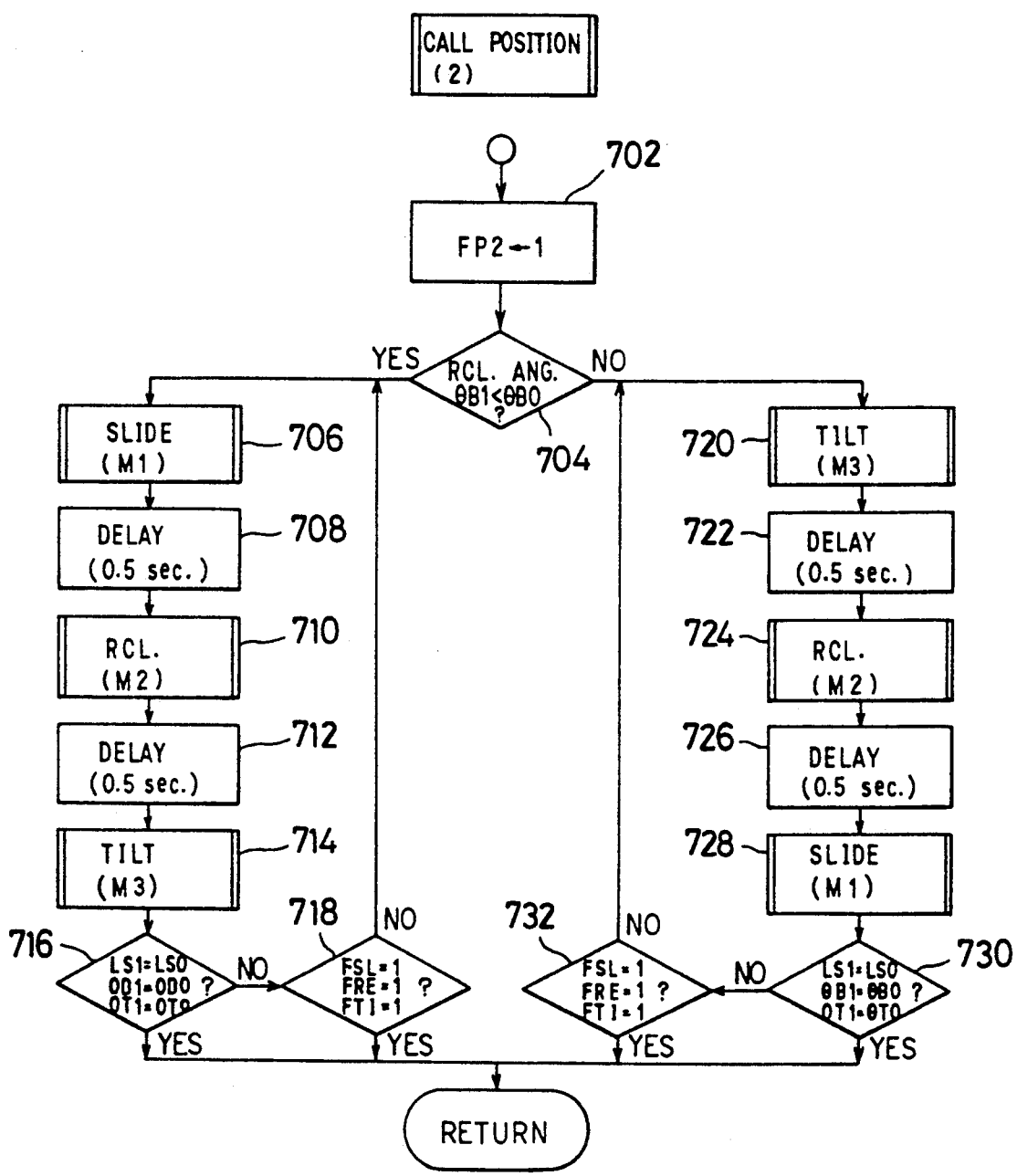
FIG. 11 is a flow chart of a routine for calling a position (2) and executing associated operations.

Suppose that, in the "M Mode" selected by the mode selection switch (14), the position switch (16-2) is operated, then "NO" is decided at (202) in the "CALL MEMORY POSITION & OPERATE" routine in FIG. 6, while at (204) "YES" is answered, thus leading the step flow to the "POSITION (2)" routine in FIG. 11, wherein a proper processing is carried out to place the seat (19) in the memory position defined in that particular "POSITION (2)" routine.

As shown in FIG. 11, at first, the operation flag (FP2) for the position switch (16-2) is set to 1 at (702), and then a determination is made as to whether or not the present value ($\theta$B1) of reclining device is smaller than the memory value ($\theta$B0) defined in this routine, at (704). Assuming the seat back (26) to be more forwardly inclined than the memory position, a decision "YES" is given at (704), and then, with the step being led to the "SLIDE (M1)" routine in FIG. 8, in which an appropriate processing is effected so as to place the seat (19) in the fore-and-aft direction at the memory position defined in that particular routine, at (706). After such processings in FIG. 8, with a time delay of about 0.5 sec. at (708) in FIG. 11, the step flows to the "REC. (M2)" routine, in which processings are properly made so as to place the seat (19) in the fore-and-aft direction, at the memory position defined in the POSITION (2)" routine, at (706).

Thereafter, at (716), it is ascertained whether all the present values (LS1), ($\theta$B1), ($\theta$T1) meet with the memory values defined in FIG. 11. If "YES" is given there, the step is returned to the routine in FIG. 6.

When the seat (19) is set in the memory position defined in FIG. 11 by operation of the position switch (2), the associated operation flags (FP1)(FP2)(FP3) and overload detection flags (FSL)(FRE)(FT1) are reset to 0 at (210) in FIG. 6, after which, the step is returned to the main routine in FIG. 5.

Figure 12:
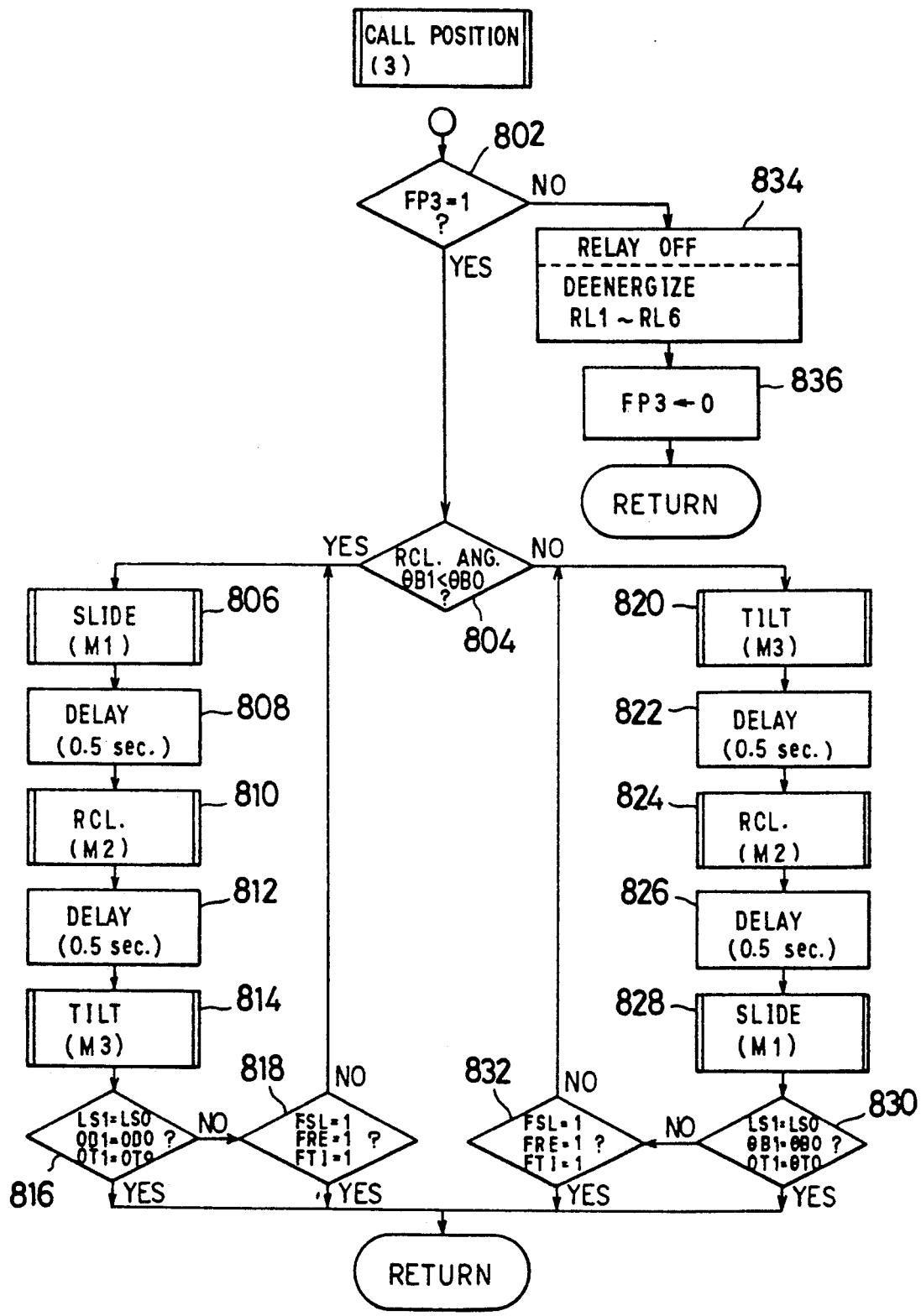
FIG. 12 is a flow chart of a routine for calling a position (3) and executing associated operations.

Further, with the "M Mode" selected by the mode switch (14), operating the position switch (16-3) will result in "NO" being given in the blocks (202) and (204) of the "CALL MEMORY POSITION & OPERATE" routine in FIG. 6, while giving "YES" at (206) there, whereupon the step will flow to the "CALL POSITION (3)" routine in FIG. 12. In that routine, a proper processing is effected so as to place the seat (19) in the memory position defined, as in (214).

As shown in FIG. 12, a first step is for checking up whether the operation flag (FP3) related to the position switch (16-3) is set to 1 or not, at (802). Since the flag (FP3) is set to 1 by the switch (16-3), the block (802) shows "YES". Then, at (804), it is determined whether the reclining angle or the present value ($\theta$B1) is smaller than the memory value ($\theta$B0) or not. If the seat back (26) is more forwardly than the memory position, "YES" is answered at that block (804), thus leading the step flow to the slide routine in FIG. 8, in which an appropriate processing is carried out to set a position of the seat (19) in the fore-and-aft direction at the memory position, as in the block (806). Thereafter, as shown in FIG. 12, with about 0.5 sec. time delay, the step is flowed to the "RCL. (M2)" routine in FIG. 9, in which a proper processing is effected so as to set the reclining angle of seat back (26) at the memory position defined in the "CALL POSITION (3)" routine, at (810). Further, as in FIG. 12, again with about 0.5 sec. time delay at (812), the step is flowed to the "TILT (3)" in FIG. 10, in which an appropriate processing is effected so as to set a tilt angle of seat back upper part (26a) at the memory position, at (814). Then, the motors (M1) (M2)(M3) are driven properly according to the sub-routines, and thereafter, at (816), it is determined whether all the present values (LS1)($\theta$B1)($\theta$T1) meet with the memory values defined in FIG. 12. If "YES" is given at the block (816), the step flow is returned to the "CALL MEMORY POSITION & OPERATE" routine in FIG. 6. When the seat (19) is set at the memory positions as such by operation of the position switch (16-3), the operation flags (FP1) (FP2)(FP3) and overload detection flags (FSL)(FRE) (FTI) are reset to 0 at (210) in FIG. 6, after which, the step is returned to the main routine in FIG. 5.

Incidentally, if the mode selection switch (14) is turned from the "M Mode", which allows for setting desired memory values, over to either of "L Mode" and "S Mode" which includes stored memory values, the block (112) in the main routine in FIG. 5 gives "NO" answer, leading thus the step flow to a block (122) for ascertaining which the "L Mode" or the "S Mode" is selected by the switch (14).

If one of those two modes is selected, firstly "YES" is answered at that block (122) and then the step flows to a block (124) leading to routines in FIGS. 13(A) and 13(B) titled "CALL STORED VALUE & OPERATE".

As shown in FIG. 13(A), at first, it is checked up whether the "S Mode" is selected by the switch (14) at (902) or not. If the "S Mode" is selected, "YES" is given there, and the step undergoes next series of blocks (904), (906) and (908) in this order, checking up whether one of the position switches (16-1)(16-2)(16-3) is operated or not. Assuming that the position switch (16-1) is selected in this mode and operated, "YES" is decided at (904), which directs the step flow to the "CALL POSITION (1)" routine in FIG. 7, in which an appropriate processing is effected to call stored values related to the position (1) for the seat (19) in the S mode at (910), according to the Table 1. It is noted here that the stored memory values are set respectively as the memory value (LS0) for the slide device, the one ($\theta$B0) for the reclining device, and the one ($\theta$T0) for the seat back bending device in the "CALL POSITION (1)" routine in FIG. 7, after which, those memory values are compared with the present values (LS1)($\theta$B1)($\theta$T1), respectively.

As shown in FIG. 13(A), after having set the position (1) in the S mode at (910) as above, the operation flags (FP1)(FP2)(FP3) and overload detection flags (FSL)(FRE)(FTI) are reset to 0 at (912), as a result of which the step flow is returned to the main routine in FIG. 5.

Figure 13:
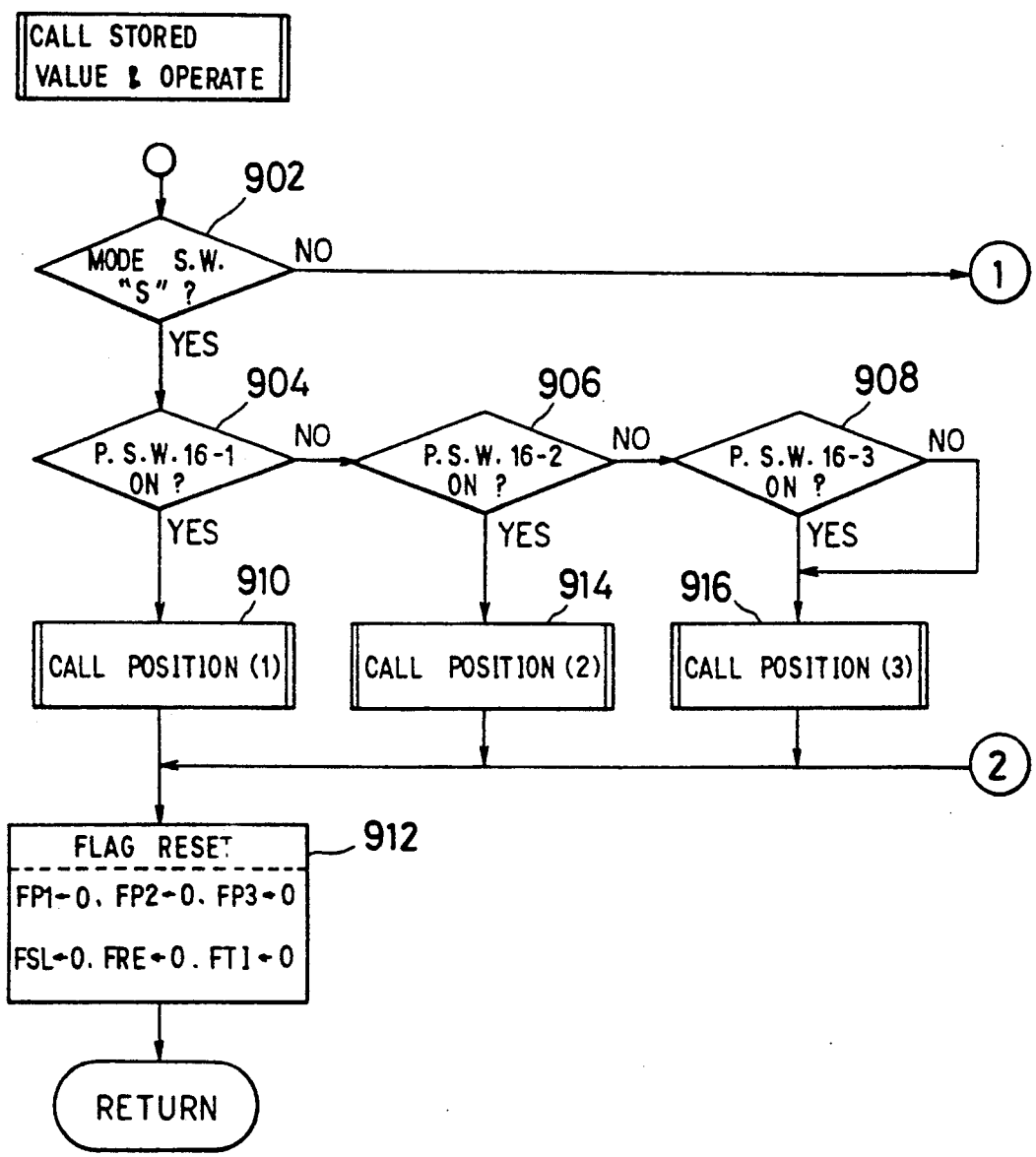
FIGS. 13(A) and 13(B) consists in a flow chart for calling a stored memory position and executing associated operations.
Figure 13:
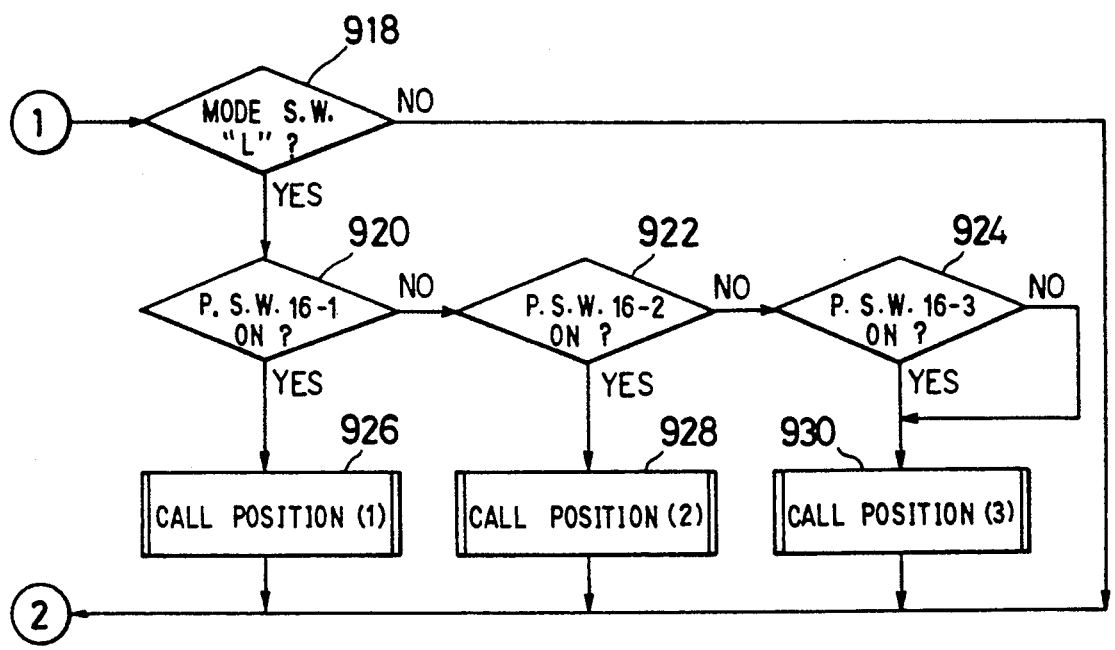

Likewise, in this particular S mode, to operate the second position switch (16-2) will cause "NO" decision to be made at the block (904) while causing "YES" decision at the block (906) in FIG. 13 (A), and the step is directed to the "CALL POSITION (2)" routine in FIG. 11, in which the position (2) of the seat (19) is called with respect to the S mode, at (914), according to the Table 1.

Further, likewise, in this particular S mode, to operate the third position switch (16-3) will cause "NO" decision to be made at the blocks (904)(906) while causing "YES" decision at the block (908), and the step is directed to the "CALL POSITION (3)" routine in FIG. 12, in which the position (3) of the seat (29) is called with respect to the S mode, at (916), according to the Table 1.

In the foregoing "CALL POSITION (3)" routine in FIG. 12, a first step is for ascertaining whether or not the operation flag (FP3) is set to 1; namely for deciding whether the position switch (16-3) is turned on or not. If the switch (16-3) is operated and the flag (FP3) is set to 1, then "YES" is given at (802), whereupon the position (3) is called. Suppose now that, during the calling of such position (3), the switch (16-3) is turned off, "NO" is decided at (802), which results in deenergizing all the motor control relays (RL1 though RL6) to cause an immediate stop of all the motors (M1 to M3), as in (834), thus resetting the operation flag (FP3) to 0 at (836). Consequently, the step is returned to the routine in FIG. 13(A). Accordingly, it is to be seen that during calling the position (3), the control of the motors (M1)(M2)(M3) is only allowed to be made when operating the switch (16-3), and therefore, should the seat (19) contact an occupant on a rear seat in making control to set the seat (19) in the relax position, an immediate release from the push on the switch (16-3) will instantaneously stop the motors (M1 to M3), in contrast to a one-touch type switch, which insures a safety to the rear-seat person and protect the motors and the like.

If the "L Mode" is selected by the mode selection switch (14), "NO" is decided at (902) in FIG. 13(A), and then, as shown in FIG. 13(B), at (918), it is determined whether the L mode is selected or not. If "YES" is decided there, the step flow undergoes a series of blocks (920)(922)(924) in this order, checking up whether one of the position switches (1)(2)(3) is operated or not. Assuming that the first position switch (16-1) is selected in the present L mode, at (902), "YES" is decided, thus directing the step to the "CALL POSITION (1)" routine in FIG. 7, in which the position (1) of the seat (19) is called with respect to the "S Mode", at (926), according to the Table 1. In such case, the memory values for the position (1) in the L mode are set as the memory values (LS0), ($\theta$B0) and ($\theta$T0) in the routine in FIG. 7, respectively, and then compared with the corresponding present values (LS1), ($\theta$B1), and ($\theta$T1). Thereafter, as shown in FIGS. 13(A) and 13(B), subsequent to the setting of position (1) in the L mode at (926), the associated operation flags (FP1)(FP2)(FP3) and overload detection flags (FSL)(FRE)(FTI) are reset to 0 at (912), which returns the step flow to the main routine in FIG. 5.

Likewise, in this particular L mode, to operate the second switch (16-2) will cause "NO" decision to be made at (920) in FIG. 13(A) while causing "YES" decision at (922) in FIG. 13(B), as a result of which, the step flow is directed to the "CALL POSITION (2)" routine in FIG. 11, in which the position (2) of the seat (19) is called with respect to the L mode, at (930), according to the Table 1.

Further, likewise, in the L mode, to operate the third switch (16-3) will cause "NO" decision to be made at (920) in FIG. 13(A) as well as at (922) in FIG. 13(B), while causing "YES" decision at (924) in FIG. 13(B). Then, the step flow is directed to the "CALL POSITION (3)" routine in FIG. 12, in which the position (3) of seat (19) is called with respect to the L mode, at (930), according to the Table 1.

From the descriptions above, it is appreciated that, a standard position for physique classification required can be set temporarily in positioning the seat (19) by switch operation, without complicated switch operations, allowing an occupant on the seat to easily attain his or her desired seating posture, and that, with thus-temporarily-set seat position being used as a reference position, to operate the manual switch (12) permits the occupant to make a fine adjustment for the associated devices in the seat to obtain an optimal seat position fitting most to his or her own physique or seating taste. This avoids an annoying labor in adjusting the seat positions and provides an easy method for setting an optimal seat position. Further, by operating the first position switch (16-1), an occupant on the seat can easily call and set the normal position (position (1)) from any of the enjoy position (position (2)) and relax position (position (3)). This easy, direct accessibility to a desired seat position from another seat positions eliminates the complicated switch operations inherit in the prior art, thus facilitating switch operation when the occupant descends from and climbs onto the seat. Still further, according to the present invention, memory is divided into a stored memory area, in which memory values have already been stored for each of the physique classifications, and a loadable memory area which permits desired memory values to be set and stored therein for subsequent call thereof. The provision of such loadable memory area is effective in allowing for calling again and again an optimum seat position data which have been set by the manual switch (12), through memory call operation only.

While having described the present invention thus far, it should be understood that the invention is not limited to the illustrated embodiment, but any other replacements, modifications and additions may be structurally possible thereto without departing from the spirit and scope of the appended claims. For instance, any other kinds of seating postures than the enjoy and relax positions may be set as the stored memory position. Further, the orders of operation shown in the Tables 1 and 2 may be altered properly, depending on the design or any other required circumstances. In this respect, if the operation orders are changed in reference to the present position of the seat back (26), it is possible to arrange that the seat back (26) as well as its upper part (26a) will not contact an occupant on a rear seat, even if those seat sections are inclined much backwardly. While description is made of the above-stated steps and operation orders, using the reclining angle of seat back (26) as a reference position, yet it may be possible to use the fore-and-aft seat position as such reference position for executing the operation orders. The present device may be applied to other kinds of seating posture adjustment devices, other than the slide device (20), reclining device (22) and seat back bending device (24), and also applied to a driver's seat as well as seats used in a train, airplane, ship, or for barbers' seat, or the like.

What is claimed is:

1. A method for controlling a motor in a powered seat, in which said seat includes a seat cushion, and a seat back having a movable upper part, said method comprising the steps of:

detecting at least a location of said seat in a fore-and-aft direction thereof, a reclining angle of said seat back, and a tilt angle of said seat back upper part;

classifying a predetermined number of body sections for a physical constitution of an occupant on said seat;

defining a certain seat position fitting to each of average physiques obtained for each of said predetermined number of said body sections;

pre-setting said certain seat position on basis of an amount of displacement of said seat, seat back and seat back upper part from their set reference positions, and defining said seat position to be a standard position for each of said body sections;

permitting said standard position to be set temporarily by operation of position switch means;

and then permitting adjustment in position of said seat in said fore-and-aft direction, said reclining angle of said seat back, and said tilt angle of said seat back upper part, from the thus-temporarily set standard position, by operation of a manual switch means.

2. The method as defined in claim 1, wherein said physical constitution of said occupant is divided into two physical constitution sections, one of them being defined by a small height of said occupant, and another of them being defined by a tall height of said occupant, wherein there are provided an enjoy position where said occupant can enjoy sight-seeing over a window of automobile, and a relax position where said occupant can take rest or a nap, and wherein said method further includes the steps of:

permitting said enjoy and relax positions to be set in each of said two physical constitution sections; and permitting a normal position to be set in each of said two physical constitution sections, said normal position being a common position for both of those two sections, where said occupant take an ordinary seating posture on said seat.

3. The method as defined in claim 1, wherein there is further provided a memory position in addition to said standard position, which memory position is able to be set as desired by said occupant, and wherein said method further includes the step of permitting said memory position to be set as a desired preset position of said seat.

4. The method as defined in claim 1, wherein there are provided devices for causing said seat to move in said fore-and-aft direction, for adjusting said reclining angle of said seat back, and for adjusting said tilt angle of said seat back upper part, and wherein said method further comprises the steps of:

detecting present positions respectively of movable parts of said devices;

permitting said standard position to be set for each of said movable part of said devices, thus providing their respective standard positions;

selecting a desired one of said standard positions;

providing memory positions respectively of said movable parts of said devices;

selecting a desired one of said memory positions;

permitting one of the thus-selected standard and memory positions to be compared with said present positions;

altering orders of operations for actuating said devices, depending upon a difference between said present positions and corresponding one of said selected standard and memory positions; and thereby causing said seat to be set at said one of said selected standard and memory positions from said present positions.

5. The method as defined in claim 4, wherein said method includes the steps of:

detecting a present reclining angle of said seat back;

ascertaining one of standard reclining angle and memory reclining angle from said selected standard and memory positions, with regard to said seat back;

comparing said one of standard and memory reclining angles with said present reclining angle; and permitting for altering said steps of operations for actuating said devices, depending upon a difference between said one of standard reclining angle and memory reclining angle, and said present reclining angle.

6. The method as defined in claim 2, wherein when setting said seat at said relax position, said motor is only allowed to drive while keeping to turn on a corresponding position switch means.

7. A device for controlling motors in a powered seat, in which said seat includes a seat cushion, and a seat back having a movable upper part, said device comprising:

a motor for causing said seat to be adjustably moved in a fore-and-aft direction, thereby allowing adjustment in position of said seat in said fore-and-aft direction;

a motor for adjusting an reclining angle of said seat back;

a motor for adjusting a title angle of said upper part of said seat back;

a manual switch means for allowing said motors to be manually controlled for adjustment of said seat, seat back and seat back upper part;

a mode selection switch means for selecting one of predetermined plural modes divided according to physical constitution sections of an occupant on said seat;

a position switch means for selecting one of plural preset standard positions and controlling corresponding one of said motors;

a central processing unit for processing input data according to a predetermined program and properly controlling corresponding one of said motors; and position detecting means for detecting said position of said seat in said fore-and-aft direction, said reclining angle of seat back, and said tilt angle of said seat back upper part, wherein, by operating said position switch means, said standard positions may be temporarily for each of said modes divided according said physical constitution sections of said occupant.

8. The device as defined in claim 7, wherein said device further comprises a memory setting switch means for setting desired seat positions and storing them in memory, and a mode memory means which is provided in said mode selection switch means, and wherein said desired seat positions may be set and stored in said memory by operating said memory setting switch means, and further may be selected and set in a mode defined by said mode memory means, by operation of said position switch means.

* * * * *